United States Patent
Speer et al.

(10) Patent No.: US 11,892,092 B2
(45) Date of Patent: Feb. 6, 2024

(54) HYDRAULIC UNIT AND CONTROL UNITS FOR HYDRAULIC BRAKE SYSTEMS

(71) Applicant: Robert Bosch GmbH, Stuttgart (DE)

(72) Inventors: Harald Speer, Freiberg (DE); Edgar Kurz, Heilbronn-Horkheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/172,573

(22) Filed: Feb. 22, 2023

(65) Prior Publication Data

US 2023/0192045 A1 Jun. 22, 2023

Related U.S. Application Data

(63) Continuation of application No. 16/616,281, filed as application No. PCT/EP2018/067189 on Jun. 27, 2018, now abandoned.

(30) Foreign Application Priority Data

Jul. 4, 2017 (DE) ..................... 10 2017 211 324.3

(51) Int. Cl.
*F16K 31/06* (2006.01)
*B60T 8/36* (2006.01)
*F15B 15/14* (2006.01)
*F16K 27/00* (2006.01)
*F16K 27/02* (2006.01)
*F16K 31/08* (2006.01)
*B60T 8/40* (2006.01)

(52) U.S. Cl.
CPC ............ *F16K 31/06* (2013.01); *B60T 8/3615* (2013.01); *B60T 8/4031* (2013.01); *F15B 15/1404* (2013.01); *F16K 27/003* (2013.01); *F16K 27/029* (2013.01); *F16K 31/082* (2013.01)

(58) Field of Classification Search
CPC ...... F16K 31/082; F16K 27/029; F16K 31/06; B60T 8/3615; F15B 15/1404
See application file for complete search history.

(56) References Cited

U.S. PATENT DOCUMENTS

| | | | | |
|---|---|---|---|---|
| 5,445,448 A | * | 8/1995 | Wolff | B60T 8/363 303/119.2 |
| 2005/0051142 A1 | * | 3/2005 | Zdravkovic | F16K 31/0665 251/129.1 |
| 2018/0340625 A1 | * | 11/2018 | Kurz | B60T 15/36 |

FOREIGN PATENT DOCUMENTS

JP H07332534 * 12/1995

* cited by examiner

*Primary Examiner* — Atif H Chaudry
(74) *Attorney, Agent, or Firm* — Maginot, Moore & Beck LLP

(57) ABSTRACT

In a hydraulic unit, which is for a hydraulic brake system, that has a hydraulic block and at least one valve device, the valve device includes a hydraulic cartridge with a valve seat and with a movable closing body for blocking and opening the valve seat, and a magnet assembly with a magnet coil for generating a magnetic force for moving the closing body. The magnet assembly is integrated into the hydraulic block, and the valve device has a permanent magnet in order to assist the movement of the closing body by means of magnetic force.

16 Claims, 2 Drawing Sheets

HYDRAULIC UNIT AND CONTROL UNITS FOR HYDRAULIC BRAKE SYSTEMS

This application is a continuation of application Ser. No. 16/616,281, which was filed on Nov. 22, 2019 as a 35 U.S.C. § 371 National Stage Application of PCT/EP2018/067189, filed on Jun. 27, 2018, which claims the benefit of priority to Serial No. DE 10 2017 211 324.3, filed on Jul. 4, 2017 in Germany, the disclosures of which are incorporated herein by reference in their entirety.

The disclosure relates to a hydraulic unit for a hydraulic brake system with a hydraulic block and at least one valve apparatus, the valve apparatus comprising the following elements: a hydraulic cartridge with a valve seat and with a displaceable closing body for blocking and releasing the valve seat and a magnet assembly with a solenoid for generating a magnetic force for displacing the closing body, wherein the hydraulic unit is characterized in that the magnet assembly is integrated into the hydraulic block and the valve apparatus has a permanent magnet in order to support the displacement of the closing body by means of magnetic force.

BACKGROUND

For example, patent application DE 101 04 875 A1 is known from the prior art. This publication relates to a hydraulic assembly for slip-controlled brake systems of motor vehicles with a valve block with receiving bores for in each case a hydraulic part of electromagnetically activated valves which include in each case a valve dome which contains magnetically active elements such as an armature and a magnetic core of the hydraulic part and in each case an electric part which is pushed onto the valve dome and has an electric coil which encloses said valve dome, a coil housing as well as an annular disc accommodated at least indirectly in the coil housing on the side facing the hydraulic part.

DE 33 05 833 A1 discloses a bistable solenoid valve which has an exciter coil and an armature which dips in it and which is composed of a permanent magnetic material, is polarized in its direction of movement and forms a valve seat. A magnetic field conducting body projects like a core into the exciter coil and fills a part of the length of the exciter coil.

A further magnetic field conducting body is arranged next to that end of the exciter coil into which the armature dips and is formed in the form of an annular disc which surrounds the armature with a spacing. In the case of a deenergized exciter coil, forces act between these magnetic field conducting bodies and the armature which move the armature into latching positions or at least hold them there and thus ensure stable switching positions of the solenoid valve. In this solenoid valve, there is no need for a spring which can bring the valve part into a predetermined latching position.

SUMMARY

In contrast, the hydraulic unit according to the disclosure advantageously enables a very small overall installed size while satisfying the hydraulic requirements for ESP and assistance functions.

This is enabled by the features disclosed herein.

The hydraulic unit according to the disclosure for a hydraulic brake system with a hydraulic block and at least one valve apparatus, the valve apparatus comprising the following elements: a hydraulic cartridge with a valve seat and with a displaceable closing body for blocking and releasing the valve seat and a magnet assembly with a solenoid coil for generating a magnetic force for displacing the closing body is characterized in that the magnet assembly is integrated into the hydraulic block and the valve apparatus has a permanent magnet in order to support the displacement of the closing body by means of magnetic force.

This refers to the hydraulic unit comprising at least the two structural units hydraulic block and valve apparatus. The valve apparatus (also referred to as valve or solenoid valve) comprises the component groups magnet assembly and hydraulic cartridge. In this case, at least the magnet assembly is integrated into the hydraulic block. This means that the hydraulic block has an opening in which this component group can be accommodated and integrated. It is not necessary for this purpose that the hydraulic block entirely encloses the component group. Rather, integration is to be understood such that the component group is located spatially within the volume block represented by the lateral surfaces of the hydraulic block. For example, the valve apparatus, installed flush with the surface in a recess of the hydraulic block, can be regarded as integrated therein. A functional integration can also be present in addition to the spatial integration. A functional integration is characterized, for example, by functional interactions such as, for example, thermal transmission or enabling fluid flows between the components. The integration can of course also comprise a corresponding frictional and/or positive connection.

The integration of valve apparatuses into the hydraulic block generally leads, however, to a pronounced reduction in the available magnetic force. On one hand, this is due to the fact that the integration requires a small installation volume of the valves. The coil size, which has a direct influence on the magnetic force which can be generated, is also affected by this. As a result of the integration of the coils into a metallic housing such as the hydraulic block, there can also arise a significant influence as a result of a weakening and/or disruption of the generated magnetic field. These effects have such a negative influence on the power available for switching the valve or its speed that hydraulic requirements for ESP systems and the driver assistance system can no longer be ensured.

The loss of power which arises in the case of a valve apparatus integrated into the hydraulic block can, however, be compensated for by a permanent magnet positioned and installed at a suitable location. For example, the permanent magnet can be connected fixedly to the solenoid armature in order to assist the movement of the solenoid armature. For this purpose, the permanent magnet can be introduced and/or sprayed on or cast into a recess on that end surface of the armature which faces the pole core. Of course, the permanent magnet also has to be adapted to the respective valve apparatus in terms of its size and type. For example, the permanent magnet can be configured to be disc-shaped.

The hydraulic brake system is, for example, a hydraulic brake system for a motor vehicle, in particular for a car or a motor bike. As a result of this, as already indicated, a magnetic loss of force can advantageously be avoided and thus the requirements for use in an ESP and assistance function are furthermore satisfied. The use of this valve design in future systems is thus enabled. A small solenoid valve can be enabled as a result of the integration of a permanent magnet, for example, into the armature. The integration of the valve apparatus into the hydraulic block also has a number of other advantages in addition to the more compact overall installed size of the hydraulic unit: for example, the housing (i.e. the hydraulic block) enables good heat discharge for the valve apparatus (in particular for the magnet assembly). The heat discharge into the housing (i.e. into the hydraulic block) has a further advantage: in winter, the brake fluid is preheated at the pump, this leads to improved dynamics of the valve as a result of a rapid pressure build-up in winter. Simplified mounting of the hydraulic unit can furthermore be enabled as a result of this. This leads to cost savings. A calibration/adjustment of hydraulic and magnetic force tolerances is also advantageously achieved by only one assembly. This leads to an increase in functional precision and reproducibility and thus functional improvement. Extensive advantages also arise in the peripheral and direct environment. A simplification of the structure of the control unit is thus enabled, for example, as a result of an integration of the valve apparatus into the hydraulic block. This is also associated with cost savings. Moreover, as a result of this design, thermal measures in the control unit for the discharge of heat (and thus also to reduce costs) can be omitted.

In one advantageous embodiment, the hydraulic unit is characterized in that the valve apparatus is integrated at least partially, in particular fully into the hydraulic block.

As already stated, the valve apparatus comprises the component groups magnet assembly and hydraulic cartridge. It should correspondingly be understood that one of the two component groups or both are partially integrated into the hydraulic block. It is advantageously alternatively provided that both component groups are fully integrated into the hydraulic block. A simple functional connection to the fluid ducts of the hydraulic block and/or to a pump group acting into the hydraulic block can in particular be enabled as a result of the integration of the hydraulic cartridge. The advantages of the integration of the magnet assembly in the hydraulic blocks are—as already stated—e.g. the heat discharge and e.g. the consequently optimized dynamics of the valve in the case of cold temperatures.

In one possible configuration, the hydraulic unit is characterized in that the magnet assembly is retained by direct means, in particular caulking, in the hydraulic block.

This refers to the fact that a direct connection can be formed or is formed between the magnet assembly and the hydraulic block. For example, a direct caulking of the structural unit of the magnet assembly with the hydraulic block occurs. The entire valve apparatus can be anchored on the hydraulic block by means of this connection. A simplified mounting of the components can advantageously be carried out.

In one preferred embodiment, the hydraulic unit is characterized in that the hydraulic cartridge is retained by means of the magnet assembly in the hydraulic block.

This refers to the fact that there is a connection between the component groups of the valve apparatus hydraulic cartridge and the magnet assembly. The valve apparatus is furthermore fixed in the hydraulic block by means of the magnet assembly. The hydraulic cartridge is thus also fixed in the hydraulic block via the magnet assembly. Of course, further means can ensure, for example, precise positioning of the hydraulic assembly or providing it with support such as, for example, protrusions and/or bearing surfaces in the hydraulic block including pressing in. However, the otherwise frequently used caulking of the hydraulic cartridge with the hydraulic block for fastening the valve apparatus can be dispensed with in this design. As a result of this, a simplified structure and optimized mounting can advantageously be enabled.

In one alternative further development, the hydraulic unit is characterized in that the magnet assembly is integrated into the hydraulic block in such a manner that a laminar thermal transmission from the magnet assembly to the hydraulic block is enabled.

This refers to the fact that, for example, a cylindrical recess is provided in the hydraulic block, into which recess a cylindrical magnet assembly can be integrated. As a result of this, optimized heat transmission can be enabled.

In one advantageous configuration, the hydraulic unit is characterized in that the magnet assembly bears substantially in a gap-free manner against the hydraulic block.

This refers to the fact that the recess in the hydraulic block as well as the form and dimension of the magnet assembly are matched to one another in such a manner that there is a defined fit in the installed state. The fit enables, for example, the cylindrical magnet assembly and the cylindrical recess to bear flat against one another. This gap-free fit formation has been shown to be a simple structural measure for implementing optimized heat transmission.

In one possible embodiment, the hydraulic unit is characterized in that a thermal transition between the magnet assembly and the hydraulic block is formed by means of two defined, thermally conducting materials, in particular metals.

This refers to the fact that e.g. the hydraulic block as well as an outer housing part of the magnet assembly are composed of metal and thus improves heat transfer. Good thermal conduction can be enabled by the metallic transition as a result of the integration of the magnet coil into the hydraulic block. This enables an improvement in the functioning of the hydraulic unit, in particular in case of cold temperatures.

In one preferred embodiment, the hydraulic unit is characterized in that a thermal conductivity-optimizing medium is incorporated between the magnet assembly and the hydraulic block.

This refers to the fact that e.g. a heat-conducting paste fills a cavity between the magnet assembly and the hydraulic block. For this purpose, for example, the heat-conducting paste can be applied on the inside of the recess of the hydraulic block and/or the outside of the magnet assembly prior to mounting. In one alternative embodiment, the cavity can be sprayed out even after mounting. A positive effect on thermal transmission can advantageously be achieved as a result of this measure with only little extra outlay.

In one possible further development, the valve apparatus for a hydraulic unit is characterized in that the valve apparatus is configured as a premountable assembly.

This refers to the fact that components and component groups of the valve unit are configured so that a separately operable assembly ("valve unit") can be mounted from this. The component groups are therefore not only joined together during final assembly, rather this can already be carried out at an earlier point in time. This configuration can therefore also be understood such that a hydraulic unit with a valve apparatus is provided, wherein the valve apparatus is formed as a premountable assembly. As a result of this, the complexity of mounting can be advantageously simplified. A separation of several mounting steps to form coherent units is also possible. As a result of this, a cost reduction can advantageously be enabled.

According to the disclosure, a control unit for a hydraulic unit is furthermore provided which is characterized in that the control unit comprises a control for the magnet assembly.

This refers to the fact that the control unit is configured to enable an actuation of the magnet assembly. In particular, the magnet coil is to be understood as a magnet assembly. In this sense, the hydraulic unit comprises a control unit, wherein the control unit enables an actuation of the valve apparatus—in particular of the magnet assembly. As a result of this, a functional integration of the actuation directly into the control unit is advantageously produced. A functional separation between the various structural units is, however, advantageously also produced. This enables a compact design of the hydraulic unit and simple mounting thereof.

In one advantageous embodiment, the control unit for a hydraulic unit is characterized in that the control unit is connected directly to the hydraulic block, in particular without spatially accommodating the magnet assembly or encompassing the magnet assembly.

This refers to the fact that the hydraulic unit encompasses both the hydraulic block as well as a control unit. These two structural units are joined spatially directly on one another. As a result of this, a reduction in the overall installed size is advantageously produced. It should furthermore be emphasized that the control unit is configured so that it does not accommodate the magnet assembly, in particular the magnet coil. The control device therefore does not provide, for example, any recesses into which the magnet coils must or can be inserted. The magnet assembly or magnet coils are therefore only integrated into the hydraulic block. The control unit covers the magnet coils, however, potentially by bearing against the hydraulic block. As a result of this, a narrow control unit and a reduction in the overall structural volume of the hydraulic unit are advantageously produced.

In one preferred further development, the control unit for a hydraulic unit is characterized in that a side of the control unit which bears against the hydraulic block is substantially flat and in particular has no recesses for accommodating the magnet assembly.

This refers to the fact that the control unit does not contain any openings into which the magnet assembly, in particular the magnet coil is integrated. The hydraulic unit therefore contains a control unit, wherein a side of the control unit which bears against the hydraulic unit is substantially flat, and in particular has no recesses for accommodating the magnet assembly. As a result of this, a simple structure of the control unit is advantageously produced. Moreover, as a result of the omission of the thermal input by the magnet coil, no heat dissipation measures (and/or thermal measures) in the control unit for discharging heat are required. As a result of this, a lower cost control unit is produced. Cost savings furthermore also arise as a result of the simplification of the structure of the control unit.

BRIEF DESCRIPTION OF THE DRAWINGS

It should be pointed out that the features listed individually in the description can be combined with one another in any desired, technically expedient manner and highlight further configurations of the disclosure. Further features and expediency of the disclosure will become apparent from the description of exemplary embodiments on the basis of the enclosed figures.

In the figures.

DETAILED DESCRIPTION

Figure 1:
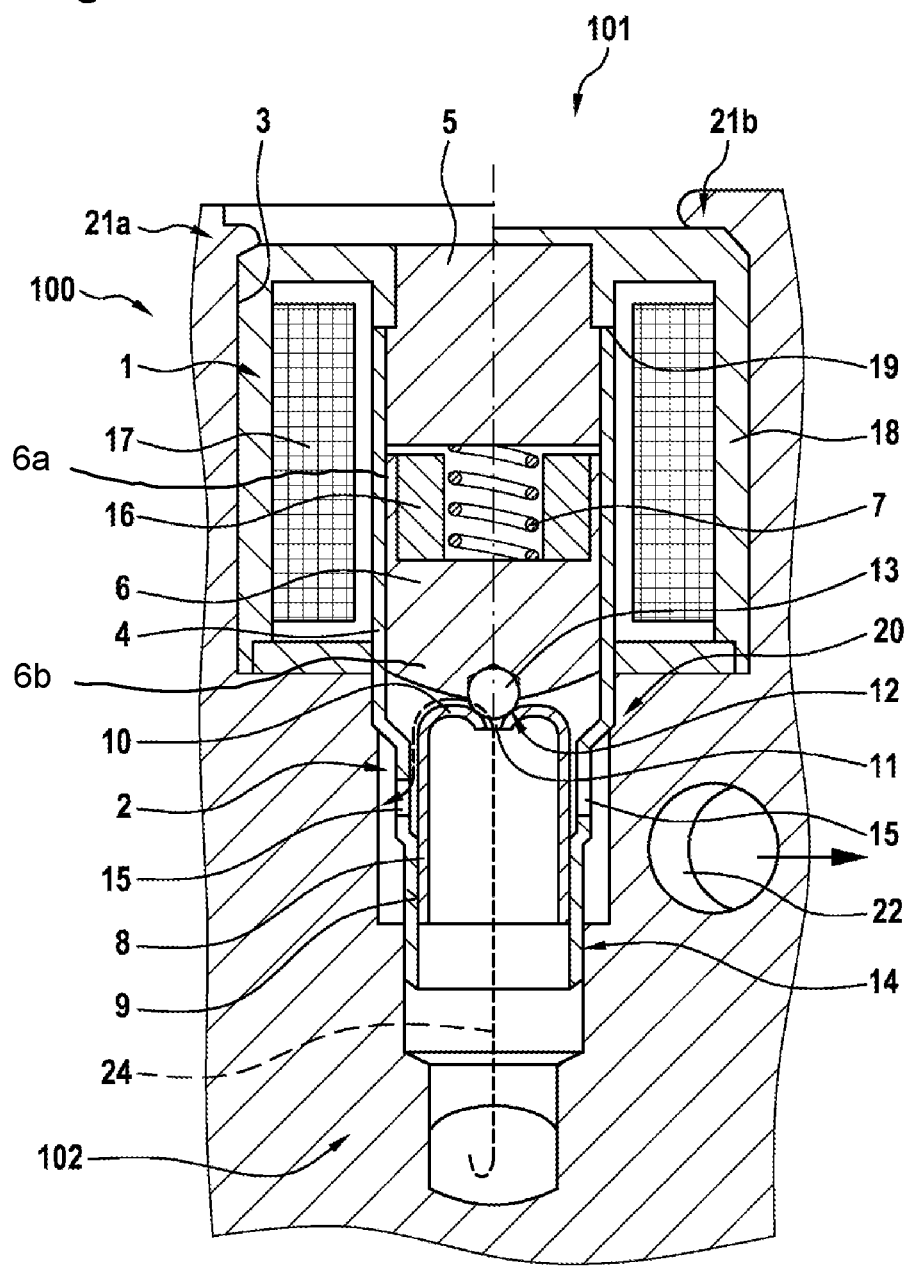
FIG. 1 shows a schematic sectional view of one embodiment of a valve apparatus of the hydraulic unit according to the disclosure.

FIG. 1 shows a schematic side view of a valve apparatus 101 for a hydraulic unit 100 for a vehicle. Valve apparatus 10—also referred to as a solenoid valve in the represented embodiment—comprises the two component groups magnet assembly 1 and hydraulic cartridge 2. Valve apparatus 101 has a housing in which it is positioned and retained. This housing is formed by hydraulic block 102. Valve apparatus 101 is integrated fully into hydraulic block 102 which has a receiving opening 3 in the manner of a stepped bore. Valve apparatus 101 inserted into receiving opening 3 has a first valve sleeve 4 in which a pole core 5 is arranged in a fixed manner and a solenoid armature 6 is arranged in an axially displaceable manner. A pressure spring 7, in the present case in the manner of a helical spring, is provided between pole core 5 and solenoid armature 6, which pressure spring 7 pushes solenoid armature 6 in the direction of a second valve sleeve 8. Second valve sleeve 8 is substantially mug-shaped, with a side wall 9 and a base 10. A through-flow opening 11 is formed in base 10, to which through-flow opening 11 a valve seat 12 is assigned. Solenoid armature 6 bears at its end facing valve sleeve 8 a closing body 13 which is formed in the present case as a sealing ball. Closing body 13 is pushed into valve seat 12 by pressure spring 7 via solenoid armature 6 so that through-flow cross-section 11 is closed.

That end of second valve sleeve 8 which is opposite base 10 faces away from solenoid armature 6 and is guided in first valve sleeve 4. This has a tapered axial portion 14 in which second valve sleeve 8 is retained in a radially tightly bearing, frictional manner. Where applicable, a weld connection between the first and second valve sleeve can also be provided in axial portion 14. First valve sleeve 4 has a region between axial portion 14 and base 10, which region runs radially spaced apart from valve sleeve 8, wherein, in this region in valve sleeve 4, several outflow openings 15 are arranged distributed over the circumference of valve sleeve 4. As a result of the radial spacing of valve sleeve 4 in the region of outflow openings 15, these are in fluidic connection with through-flow opening 11 in so far as closing body 13 was pulled by displacement of solenoid armature 6 counter to the spring force of pressure spring 7.

To this end, valve apparatus 101 has a magnet assembly 1 which is also arranged in receiver 3. Magnet assembly 1 comprises a magnet coil 17 which is arranged coaxially to valve sleeve 4 and in particular bearing against it. Magnet coil 17 extends beyond the free end of valve sleeve 4, wherein in turn in particular the pole core projects beyond magnet coil 17. Magnet assembly 1 is assigned a housing part 18 which encompasses magnet coil 17. A radially internal portion of housing part 18 is formed as stop 19 here, which stop 19 axially acts upon valve sleeve 4 at its free end. As a result, valve sleeve 4 is pushed into housing 2 and retained therein via housing part 18.

A permanent magnet 16 is furthermore provided which is connected to solenoid armature 6. For this purpose, solenoid armature 6 has at its end side facing pole core 5 a magnet receiver 6a which receives permanent magnet 16. In the exemplary embodiment represented, permanent magnet 16 is embodied as a circular perforated disc through which pressure spring 7 engages. The magnet receiver 6a is cavity formed by a circular circumferential wall extending from the body 6b of the solenoid armature 6. Permanent magnet 16 can alternatively be embodied as a square perforated plate, in which case the magnet receiver 6a can be a cavity formed by a square perimeter wall. Permanent magnet 16 enables a balancing out for a magnetic loss of force which arises in the case of small solenoid valves integrated into the hydraulic block. In order to open the valve, magnet assembly 1 is energized in the course of an opening process with a first current direction which generates a magnetic field. This causes pole core 5 and solenoid armature 6 to be attracted with permanent magnet 16 so that the air gap between solenoid armature 6 and pole core 5 is reduced and closing body 13 is lifted out of valve seat 12.

It is alternatively naturally also conceivable that the magnetic force of permanent magnet 16 is predefined so that, in order to open valve apparatus 101, permanent magnet 16, during the opening movement, moves solenoid armature 6 in the direction of pole core 5 if the pressure locked up in valve apparatus 101 falls below a predefinable threshold value so that closing body 13 is lifted out of valve seat 12.

As a result of the use of permanent magnet 16, a bistable solenoid valve can also be created. In this case, it is not only in the case of a first energization of magnet assembly 1 counter to the spring force of spring 7 that permanent magnet 16 supports the opening of valve apparatus 101 by means of its magnetic attraction to pole core 5. In the opened state, armature 6 is furthermore retained via permanent magnet 16 on pole core 5. An opposite energization of magnet assembly 1 subsequently leads to renewed closing of the valve as a result of a repulsion of solenoid armature 6 with permanent magnet 16 by pole core 5. Pressure spring 7 (as well as the pressure locked in) subsequently holds the valve closed after removal of energization.

In a further alternative, not represented, valve apparatus 101 can also be embodied without pressure spring 7.

In a region 20 on that side of outflow openings 15 opposite axial portion 14, valve sleeve 4 furthermore preferably has a diameter which forms together with the inner diameter of receiver 3 a press fit so that valve sleeve 4 is retained pressed in housing 2 in region 20, as a result of which on one hand a secure fixing and on the other hand a sealing by the pressing connection are ensured. At the same time, the force of the pressing connection acting radially on valve sleeve 4 ensures that axial portion 14 is pressed securely against valve sleeve 8 or its shell wall 9.

Figure 2:
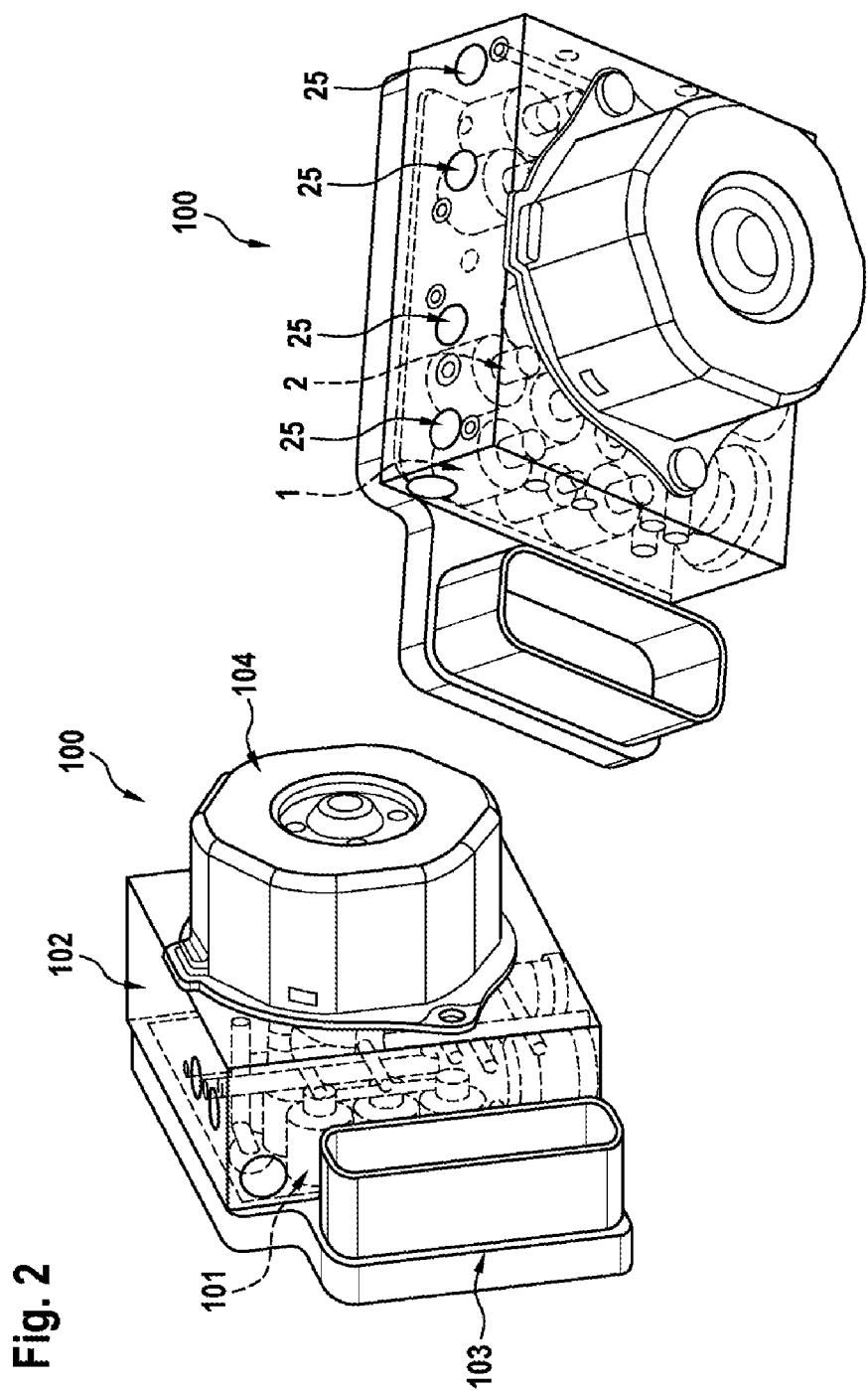
FIG. 2 shows a semi-transparent representation of one embodiment of a hydraulic unit according to the disclosure from two viewing directions.

In order to lock magnet assembly 1 in receiver 3, it is provided that hydraulic block 102 is caulked at the edge of receiver 3 for form-fitting locking of magnet assembly 1 and thus of the entire valve apparatus. Magnet assembly 1 is thus pushed into receiver 3 by caulking 21a or 21b, as a result of which valve sleeve 4 is pressed into hydraulic block 102 by means of housing part 18 and stop 19. In this case, FIG. 2 shows two alternatives: on the left half, a rolling caulking 21a and, on the right half, a force-reducing tumbling caulking 21b. In the region of outflow openings 15, hydraulic block 102 has at least one first fluid port 22 which is fluidically connected to outflow openings 15 so that hydraulic medium correspondingly reaches through the outflow opening into the fluid port(s). Hydraulic block 102 furthermore has a further fluid port 23 in the elongation of valve sleeves 4 and 8 which is directly fluidically connected to throughflow-opening 11. In the event of activation of the valve, for example, a fluid can then travel in the direction of arrow 24 from fluid port 23, through throughflow-opening 11, into outflow openings 15 to fluid port 22.

A semi-transparent representation of one embodiment of a hydraulic unit 100 according to the disclosure is shown from two viewing directions in FIG. 2. Hydraulic unit 100 comprises the component groups valve apparatus 101, hydraulic block 102, control unit 103 and pump group 104. In this case, hydraulic block 102 is represented to be transparent and highlights that valve apparatuses 101 are fully integrated structurally therein. It is apparent that both magnet assembly 1 and hydraulic cartridge 2 lie within hydraulic block 102. It also becomes clear that all valve apparatuses 101 are integrated into hydraulic block 102. The right-hand representation furthermore shows four wheel ports 25.

The invention claimed is:

1. A hydraulic unit for a hydraulic brake system, the hydraulic unit comprising:
   a hydraulic block; and
   at least one valve apparatus including;
      a hydraulic cartridge with a valve seat and a displaceable closing body configured to block and unblock the valve seat;
      a magnet assembly with a magnet coil configured to generate a magnetic force that displaces the closing body, the magnet assembly being integrated into the hydraulic block;
      a movable magnetic armature carrying the closing body and configured to move in response to the magnetic force;
      a spring arranged to exert a pressure force on the movable magnetic armature toward the valve seat; and
      a permanent magnet configured to assist the displacement of the closing body via the magnetic force, said permanent magnet defining a perforation in which the spring is disposed, and said permanent magnet disposed within a magnet receiver defined in said movable magnetic armature.

2. The hydraulic unit as claimed in claim 1, wherein the valve apparatus is integrated at least partially into the hydraulic block.

3. The hydraulic unit as claimed in claim 1, wherein the hydraulic cartridge is retained in the hydraulic block by the magnet assembly.

4. The hydraulic unit as claimed in claim 3, wherein the magnet assembly is retained in the hydraulic block by caulking.

5. The hydraulic unit as claimed in claim 1, wherein the magnet assembly is integrated into the hydraulic block in such a manner that a thermal transmission from the magnet assembly to the hydraulic block is enabled.

6. The hydraulic unit as claimed in claim 1, wherein the magnet assembly bears substantially in a gap-free manner against the hydraulic block.

7. The hydraulic unit as claimed in claim 1, wherein a thermal conductivity-optimizing medium is arranged between the magnet assembly and the hydraulic block.

8. The hydraulic unit as claimed in claim 1, wherein the valve apparatus is configured as a premountable assembly for mounting within said hydraulic block.

9. The hydraulic unit as claimed in claim 1, wherein said magnet receiver is a cavity defined in said movable magnetic armature.

10. The hydraulic unit as claimed in claim 9, wherein:
    the permanent magnet is a perforated circular disc; and
    said cavity in said movable magnetic armature is defined by a cylindrical wall.

11. The hydraulic unit as claimed in claim 9, wherein the permanent magnet is a perforated square plate.

12. A combination comprising:
    a hydraulic unit of a hydraulic brake system, the hydraulic unit including;
       a hydraulic block;
       at least one valve apparatus that includes;
          (i) a hydraulic cartridge with a valve seat and a displaceable closing body, (ii) a magnet assembly with a magnet coil configured to generate a magnetic force that displaces the closing body, the magnet assembly being integrated into the hydraulic block, (iii) a movable magnetic armature carrying the closing body and configured to move in response to the magnetic force;

(iv) a spring arranged to exert a pressure force on the movable magnetic armature toward the valve seat; and (v) a permanent magnet configured to assist the displacement of the closing body via the magnetic force, said permanent magnet defining a perforation in which the spring is disposed, and said permanent magnet disposed within a magnet receiver defined in said movable magnetic armature; and a control unit including a control configured to control the magnet assembly.

13. The combination as claimed in claim 12, wherein the control unit is connected directly to the hydraulic block.

14. The combination as claimed in claim 13, wherein a side of the control unit which bears against the hydraulic block is substantially flat.

15. The combination as claimed in claim 14, wherein the side of the control unit which bears against the hydraulic block has no recesses for accommodating the magnet assembly.

16. The combination as claimed in claim 12, wherein the control unit is connected directly to the hydraulic block without spatially accommodating the magnet assembly or encompassing the magnet assembly.

\* \* \* \* \*